Jan. 7, 1969    F. E. McNULTY ET AL    3,420,722
METHOD OF APPLYING A PROTECTIVE WRAPPING TO A CONDUIT
Filed Dec. 15, 1965
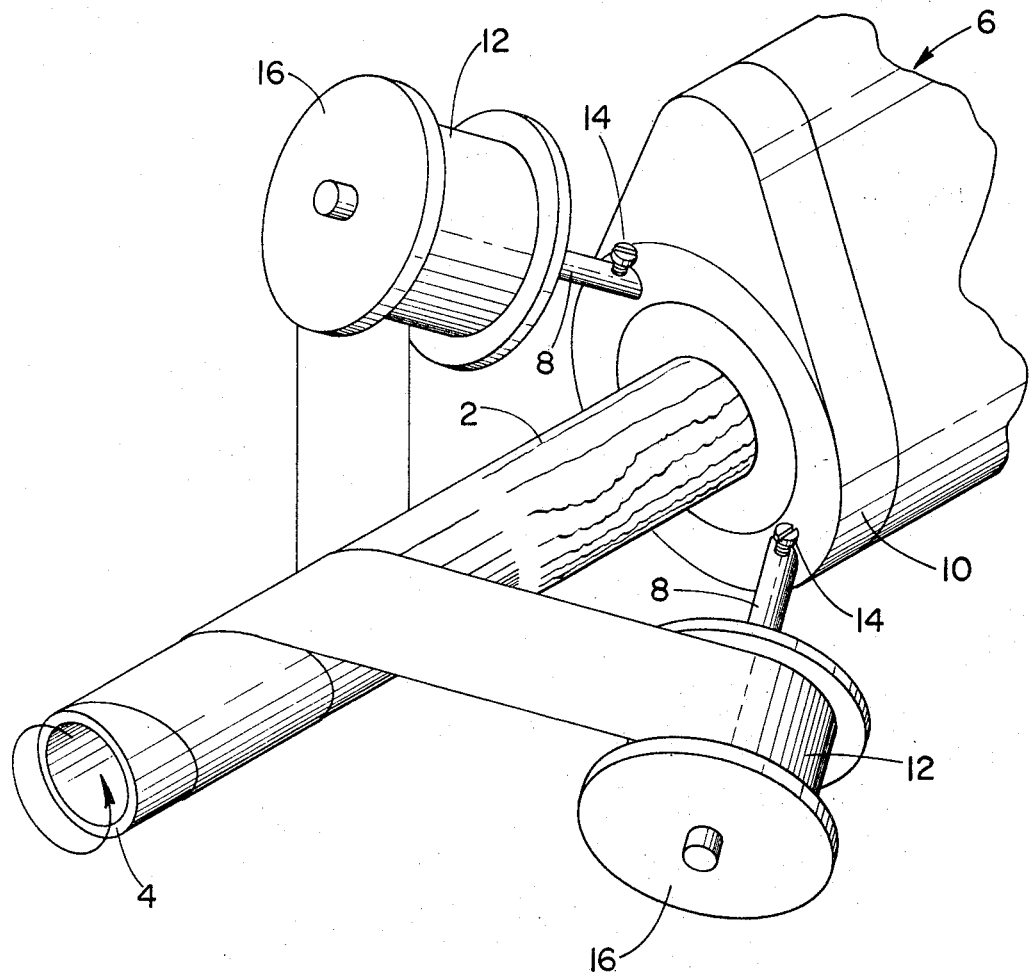

3,420,722
METHOD OF APPLYING A PROTECTIVE
WRAPPING TO A CONDUIT
Frank E. McNulty, Robert M. Nee, and Charles J. Martin, Tulsa, Okla., assignors to Nee & McNulty, Inc., Tulsa, Okla., a corporation of Oklahoma
Filed Dec. 15, 1965, Ser. No. 514,030
U.S. Cl. 156—162     9 Claims
Int. Cl. B31c *3/00;* F16l *9/14*

The present invention relates to a novel method for applying a protective wrapping to a conduit, pipe, cables and other cylindrically shaped bodies. More particularly, it is concerned with a procedure by which such bodies, covered with a layer of bituminous coating material, or equivalent, can be wrapped with an unsupported thermoplastic resin film, said coating material being at or slightly below the softening point of said film.

In the past, conduits have been wrapped by employing combinations of a hot bituminous coating and a plastic film overwrap. However, protective systems of this kind are not without disadvantages. Thus, as described in U.S. 2,713,383, it has been proposed to wrap pipe or similar conduits by first putting on a hot coating of hot microcrystalline wax and overwrapping the latter with a heat shrinkable plastic film, for example, of a copolymer of vinyl chloride and vinylidene chloride The surface temperature of the coating at the time the heat shrinkable plastic film contacts it is above the softening point of the film. The film, being under some tension but not enough to break it, tends to shrink. Many thermoplastic films tend to shrink without tension if they are subjected to temperatures above their softening point. The heat shrinkable characteristics of such films produce an exceedingly wrinkled surface after the film has been applied owing to varying stresses caused by the heat from the coating material. The shrinking action of the plastic wrapper is difficult to control and as a result causes considerable variation in thickness of the applied protective coating. This shrunk-fit wrapper is under tension and any cut or tear in the film that results, for example, when the wrapped pipe strikes a rock or a sharp object, causes the film to peel exposing the coating of varying thickness to corrosive conditions. A further disadvantage in using heat shrinkable film is that it requires overlap. Such film tends to shrink in width when it contacts the hot coating, therefore, more of this kind of film is required to secure a proper overlap to compensate for such shrinkage.

Thermoplastic pressure sensitive tapes have also been employed as pipeline wrapping material but have not met with unqualified success. Such tapes are generally applied to the uncoated pipe surface and rely entirely on good adhesion to such surface for corrosion protection. In cases where the pipe surface is clean and smooth adequate corrosion protection can usually be secured. However, in instances where such tape must be wrapped over irregular surfaces such as those produced by pipeline welds, air pockets are created leaving that portion of the pipe in contact with the air pocket completely unprotected in the event the tape is pierced or punctured.

In U.S. 3,190,780 a method is described whereby a conduit covered with a hot bituminous coating is overwrapped with a thermoplastic resin film supported by an outer layer of kraft paper or the equivalent. According to this patent, all of the tension employed in the wrapping operation is applied to the outer or supporting paper layer which serves to guide the plastic film onto the coated pipe. While this method has proved to be very satisfactory, it need only be used where temperature of the pipe coating is so high that any tension placed on the inner plastic film would cause the latter to break on contacting the surface of the hot coating.

A further disadvantage resulting from present day pipeline wrapping methods is caused in part by the fact that the standard pipe for cross country pipelines comes in forty foot lengths. This means that in one mile of such pipeline there are approximately 132 welded joints and ordinarily from twenty to as many as sixty bends in the line per mile. Wrapping over these irregularities with a relatively stiff, boardy material such as asbestos felt or kraft paper results in poor conformity of the wrapper with these irregular surfaces and also causes nonuniform displacement of the previously protective coating at such irregularities. This is the primary reason for coal tars and asphalts being applied in thicknesses of the order of three to five thirty-seconds inch.

Accordingly, it is an object of our invention to provide a method for applying protective wrapping to pipelines or similar structures by means of an unsupported thermoplastic film under conditions such that the coating surface with which the film is brought into contact during the wrapping operation is at a temperature ranging from the stretch point of said film to the softening point of the film. It is another object of our invention to provide a method for wrapping welded and/or bent lengths of pipelines or other conduits with a thermoplastic film whereby such irregularities in the pipeline or conduit are uniformly covered without substantially thinning the underlying coating material on the surface of said irregularities. It is a further object of our invention to provide a pipeline wrapping method which employs, as the protective coating material, microcrystalline wax, asphalt, coal tar, or known equivalents thereof, and a thermoplastic wrapper such as polyethylene or polypropylene, said coating and wrapper being applied under the conditions hereinafter described.

Before the method of our invention is discussed in detail, we would first like to define the following expressions appearing in the present description and claims:

(1) "Stretch point"—the temperature range over which the particular thermoplastic film employed undergoes thermal expansion. The film at this temperature is in a rather limp condition and tends to conform readily to all surfaces of the applied coating.

(2) "Film softening point"—the temperature above the stretch point but below the temperature at which the molecules in the thermoplastic film tend to reorient themselves causing the film to shrink.

In the accompanying drawing, a fragmentary view of a pipeline wrapping operation employing a conventional line traveling wrapping machine is illustrated wherein the principle of our invention is used. In carrying out this operation, a suitable coating material such as microcrystalline wax 2 having a melting point of about 165° F., is sprayed onto pipeline 4 at a temperature, for example, of about 275° F. (as the coating composition contacts the pipe) by means of conventional combination line traveling, cleaning, coating and wrapping machine 6. The latter is also equipped with a pair of wrapping arms 8 operated by wrapping head 10. The wrapping arms hold rolls 12 containing, for example, a polyethylene wrapper material. This film generally varies in thickness from about 3 to about 10 mils and for the majority of cases should be from about 4 to about 6 mils thick. Rolls 12 may be fourteen inches in diameter and hold approximately two thousand feet of wrapper. The tension exerted on wrapper is regulated by means of knobs 14 which in turn control the braking action on spools 16. Various forms of brakes are used to provide tension so that the wrapping cannot unwind without some force being exerted on it to stretch it between wrapper spool 16 and pipe 4. This operation, which is carried out at a temperature between the stretch point of the wrapper film employed and the softening point of said film, functions to secure a tightly wrapped layer over the coating material.

In operation, the brake tension on spools 16 is set so that the film will wrap the pipe with reasonably good conformation. When the film contacts the hot coating 2, the tension is decreased owing to thermal expansion (stretch point) of the film thereby allowing the latter to conform readily to any irregularities on the surface of the applied coating. Wrapping arms 8 generally rotate at a high rate of speed as machine 6 travels forward. If, as illustrated, two thermoplastic film wrappers are applied simultaneously, the forward speed of the machine applying the coating and wrappers should be synchronized so that the coating machine advances along the pipeline at the same rate as the wrappers are applied, including necessary overwrap. This prevents the occurrence of skip laps during the course of the wrapping operation. The coating and wrapping operations should also be regulated so that ample time is allowed for the hot applied coating to cool to the desired temperature before it is contacted by the thermoplastic film. In the case of microcrystalline wax, for example, the latter can be seen to turn cloudy or opaque a few inches ahead of the wrapper's leading edge. In instances where the wax has a melting point of about 165° F., the temperature of that portion of the coating contacted by the wrapper will be between the stretch point and the softening point of the latter.

While the coating may be applied at any temperature such that it flows readily onto the pipe, it should be strictly understood that the wrapping operation or the actual contacting of the wrapper film with the applied coating should not be effected at a temperature above the softening point of the film so that shrinkage of the latter can be avoided. Although it might be thought that coating materials applied at temperatures of, for example, 300° to 400° F. would require a substantial waiting period, such is not usually the case because the pipe itself serves as an excellent heat sink, particularly where the thinner or lower melting point coating compositions are employed. The waiting period required before applying the wrapper film to the hot coated surface also is less where film of greater thickness, e.g., 10 mils is employed or the higher softening point resin films are used. For a polyethylene film, this temperature generally ranges from about 160° to about 255° F. while typical polypropylene films have a softening point in the neighborhood of about 340° F.

From the foregoing description, it will be apparent that the present invention possesses many advantages over prior art methods. For example, through mechanical tension on the film, under the above recited temperature conditions, more precise and complete wrapping of the irregularities on the pipeline surface can be effected than is possible when one depends on a heat shrinkable film for such precision. Film as applied in accordance with our invention results in a more uniform coating thickness next to the pipe and does not wrinkle as is characteristic of films applied under temperature conditions that cause shrinkage thereof. Because any coating operation has to be designed around the final minimum thickness of the coating composition, this means that engineering standards are more easily met when the coating is overwrapped with film in accordance with our invention without concern for the film wrinkling considerably into the depth of the coating. With thermoplastic film applied in accordance with this invention, the heat of the coating at the time the film is overwrapped immediately relieves the mechanical tension on the film and the latter assumes a permanent altered condition that keeps it in snug conformation with welds and bends in the pipeline. In other words, there is little or no memory, i.e., tendency to return to its original dimensions, left in the film after cooling which would cause it to split apart if cut during handling or backfilling operations.

What we claim is:

1. A method of wrapping a conduit covered with a hot applied coating which comprises affixing the free end of an unsupported layer of sheet-like thermoplastic resin film to the coated surface of said conduit, and spirally wrapping said conduit with said film under tension while the temperature of that portion of the coating as it is contacted by said film ranges from the stretch point to the softening point of said film.

2. A method of wrapping a conduit as described in claim 1 in which the coating composition is a material selected from the group consisting of microcrystalline wax, coal tar and asphalt.

3. The method of claim 2 in which the thermoplastic film employed is polyethylene.

4. The method of claim 2 in which the thermoplastic film employed is polypropylene.

5. The method of claim 1 in which the thermoplastic film employed is polyethylene.

6. The method of claim 1 in which the thermoplastic film employed is polypropylene.

7. The method of claim 2 in which the conduit being wrapped is a welded pipeline.

8. The method of claim 1 in which the thermoplastic film employed has a softening point of from about 160° to about 340° F.

9. The method of claim 1 in which two unsupported films from separate sources are simultaneously spirally wrapped onto said conduit.

References Cited

UNITED STATES PATENTS

| 3,190,780 | 6/1965 | McNulty et al. | 156—162 |
| 3,163,182 | 12/1964 | Sandow et al. | 156—162 XR |
| 3,245,856 | 4/1966 | Morain | 156—187 |

PHILIP DIER, *Primary Examiner.*

U.S. Cl. X.R.

156—188, 195, 392; 138—144